US005728475A

United States Patent [19]

Rateick, Jr.

[11] Patent Number: 5,728,475

[45] Date of Patent: Mar. 17, 1998

[54] METHOD FOR MAKING PARTS USABLE IN A FUEL ENVIRONMENT

[75] Inventor: Richard George Rateick, Jr., South Bend, Ind.

[73] Assignee: AlliedSignal Inc., Morristown, N.J.

[21] Appl. No.: 702,090

[22] Filed: Aug. 23, 1996

[51] Int. Cl.[6] .............................. B32B 15/04; C23C 8/04; C23C 8/68; C23C 8/80

[52] U.S. Cl. .......................... 428/469; 148/279; 148/280; 148/425; 148/674; 148/902

[58] Field of Search .................................... 428/610, 627, 428/668, 469; 148/279, 280, 213, 214, 674, 425, 902

[56] References Cited

U.S. PATENT DOCUMENTS

| | | | |
|---|---|---|---|
| 1,127,072 | 2/1915 | Morse | 148/214 |
| 3,885,995 | 5/1975 | Cunningham et al. | 148/6.35 |
| 4,003,765 | 1/1977 | Davidson | 148/20.3 |
| 4,062,701 | 12/1977 | Juhas | 148/12.1 |
| 4,152,181 | 5/1979 | Hirakis | 148/158 |
| 4,165,243 | 8/1979 | Sarnes et al. | 148/16.5 |
| 4,204,437 | 5/1980 | Espana | 76/108 A |
| 4,231,623 | 11/1980 | Kaufman | 308/23 |
| 4,664,722 | 5/1987 | Clinkscales | 148/14 |
| 4,916,981 | 4/1990 | Suzuki et al. | 148/183 |

OTHER PUBLICATIONS

Technical Proposal for the F414–400 Nozzle Actuator Fuel Pump for GE Aircraft Engines, ASCA–861–1059P, 6 pages, May 1994.

*Primary Examiner*—John J. Zimmerman
*Attorney, Agent, or Firm*—Larry J. Palguta

[57] ABSTRACT

A piston shoe (10) of an axial piston pump or motor is crimped to an annular piston head (42) and has a flat shoe wear surface (12) that contacts a cam plate (22). A back flange (14) of the shoe (10) also wears against an auxilliary cam plate (24). In order for the piston shoe (10) to operate within a fuel environment, the piston shoe (10) must be corrosion resistant, compatible with fuel, and provide the desired wear resistance. The piston shoe (10) is made of a cold workable cobalt based alloy which is compatible with fuel and provides corrosion resistance. The wear surface (12) which bears against the cam plate (22) and the back flange (14) which bears against the auxilliary cam plate (24) are provided with a thermal diffusion boride treatment which provides the desired wear resistance. In order to restore sufficient ductility to flange (16) of the shoe (10) that will be cold worked, a solution treatment is performed at a temperature range of 2050° to 2250° F. in a non-oxidizing environment. The wear surface (12) and back flange (14) are maintained at a cooler temperature by engagement of the shoe (10) with a copper part, such that the coated surfaces do not lose their coating. The flange area (16) of the shoe (10) is then cold worked by crimping in order to form the material to the round shape of the piston head (42).

19 Claims, 1 Drawing Sheet

METHOD FOR MAKING PARTS USABLE IN A FUEL ENVIRONMENT

BACKGROUND OF THE INVENTION

This invention relates to the manufacture of pans suitable for use in a fuel environment, and in particular to pump or motor parts usable in jet fuel.

Aircraft engines have numerous parts that are usable within a hydraulic fluid environment. The parts may typically be made of steel or copper-based alloys, or may be steel coated with copper alloys. However, if the devices are to be used within a jet fuel environment, such materials are not compatible with jet fuel. Contaminants in jet fuel will corrode steel and the fuel itself will dissolve copper-based alloys, and while stainless steel will not corrode within jet fuel, it does not offer sufficient wear resistance. It is highly desirable to provide parts for devices that are to be operated within an aircraft fuel environment, wherein the parts contain the desired corrosion resistance, are compatible with aircraft fuel, provide the desired wear resistance, and which maintain their cold workability.

SUMMARY OF THE INVENTION

The present invention provides solutions to the above by providing a part having an area with increased wear resistance by means of a coating and another area treated for cold working in order to enhance wear resistance, the part comprising a cold workable cobalt based alloy material and which has a first area that is boride coated by a thermal diffusion boride treatment, and a second area suitable for cold working in order to affect the hardness thereof, the second area of the part having been heated selectively to effect a solution treatment of the second area while the first area was maintained at a lower temperature sufficient to maintain thereon the boride coating.

BRIEF DESCRIPTION OF THE DRAWINGS

One way of carrying out the invention is described in detail below with reference to the drawings which illustrate an embodiment in which.

DETAILED DESCRIPTION OF THE INVENTION

Figure 1:
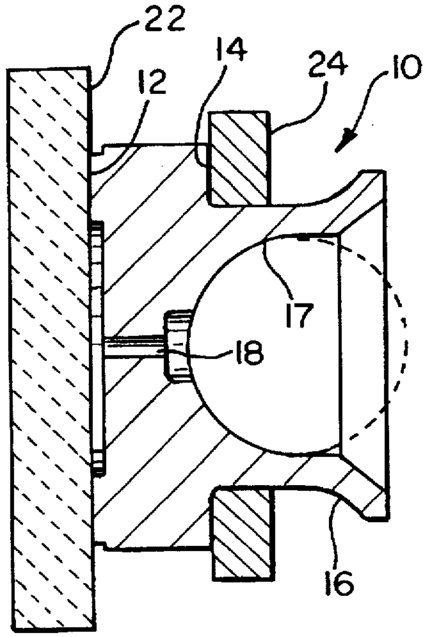
FIG. 1 is section view of a piston shoe, partial cam plate and partial auxilliary cam plate.
Figure 3:
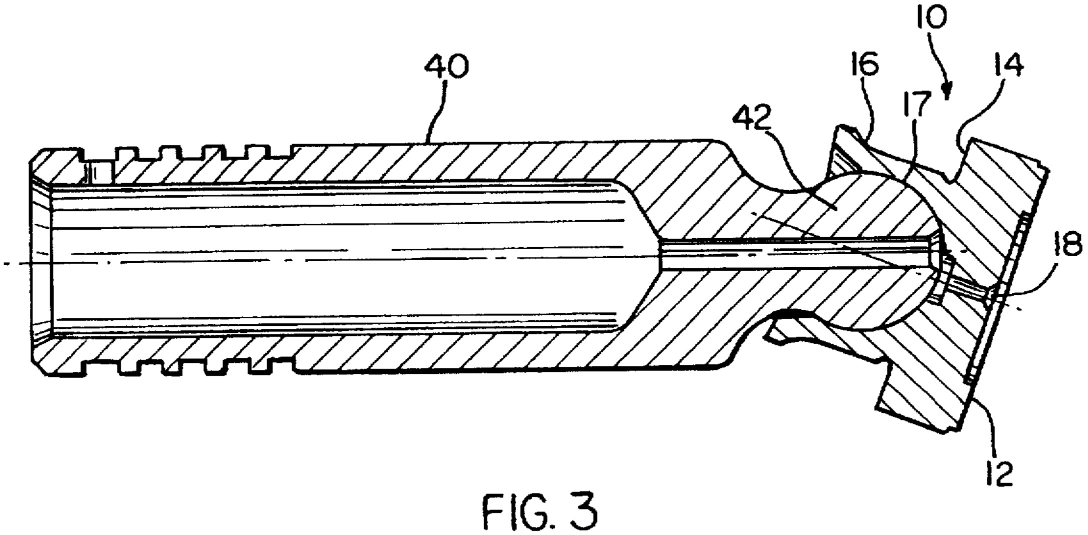
FIG. 3 is a cross-section view of the pump shoe crimped onto the annular head of a piston.

Numerous hydraulic fluid powered devices are utilized on aircraft. For example, axial piston pumps and motors typically utilize hydraulic fluid oil as the working fluid. The pump or motor may include a piston shoe which is crimped to an annular piston head. The piston shoe can be made of a steel or a copper-based alloy material, or be steel coated with copper alloys. However, another source of power within an aircraft is pressurized aircraft fuel. When aircraft fuel is utilized as a power source, the pans receiving the pressurized aircraft fuel must be compatible with the fuel. As stated above, steel, copper-based alloys, or steel coated with copper alloys are incompatible with aircraft fuel. While stainless steel will not corrode within an aircraft fuel environment, the material often does not provide sufficient wear resistance for the function the pan is to perform. Therefore, it is highly desirable to provide a material that may be utilized for the manufacture of pans that must be compatible with a fuel environment. For an axial piston pump and motor, the piston shoe is required to have sufficient wear resistance for its engagement with a cam plate and with an auxilliary cam plate. Referring to FIG. 1, the piston shoe is designated generally by reference numeral 10 and comprises a wear surface 12 which engages a cam plate 22 made of a ceramic material (sintered silicon nitride), a back flange 14 which is engaged by a metallic auxilliary cam plate 24, and a skirt or flange area 16 which is to be crimped onto the annular head of a piston. Piston shoe 10 includes a passageway 18 which permits fluid to pass therethrough and effect a lubricating fluid layer between the cam plate 22 and wear surface 12. Within a fuel environment, it is necessary for piston shoe 10 to be corrosion resistant, compatible with aircraft fuel, provide the desired wear resistance, and provide the cold workability of a portion of the shoe. Piston shoe 10 can be made from either of two cold workable cobalt based alloys, both obtainable from Haynes International. Haynes 25 or L-605 comprises nominally Co-10Ni-20Cr-15W-3Fe0.1C-1Si-1.5Mg-0.03P-0.02S, and Ultimet® comprises nominally Co-26Cr-9Ni-5Mo-3F3-2W-0.8Mn-0.3Si-0.08N-0.06C; these alloys are known as UNS R30605 and UNS R31233, respectively. These alloys are fuel compatible and are resistant to corrosion from salt water in the fuel. As is typical of cobalt based alloys, these materials offer wear resistance. However, unlike most of the cobalt wear resistant alloys which rely on a carbide phase for wear, these particular alloys develop wear resistance through cold working. Cold workability is important to the piston shoe design because the piston flange 16 is crimped onto an annular piston head and the crimping or work hardening develops wear resistance in the crimped or flanged region 16 for the wear surface that exists between the piston head 42 (see FIG. 3) and the inner surface 17 of flange 16. Thus, the desired cold workability for effecting the crimping of flange 16 precludes the use of hard coatings on the internal surface 17 of the shoe 10.

Piston shoe 10 includes the wear surface 12 and back flange 14 which engage and wear on the cam plate 22 and auxilliary cam plate 24, respectively. Both the wear surface 12 and the back flange 14 are not capable of being work hardened to provide wear resistance. Thus, this wear resistance is provided by a thermal diffusion boride treatment. The thermal fusion boride treatment is provided by means of a proprietary Borofuse® coating sold by Materials Development Inc., Medford, Mass. This treatment provides a coating which is metallurgically bonded to the wear surface and back flange of piston 10. Because high wear can occur between the cam plate 22 and wear surface 12, the cam plate is made of silicon nitride, and the Borofuse® coating offers a superior counterface material.

Figure 2:
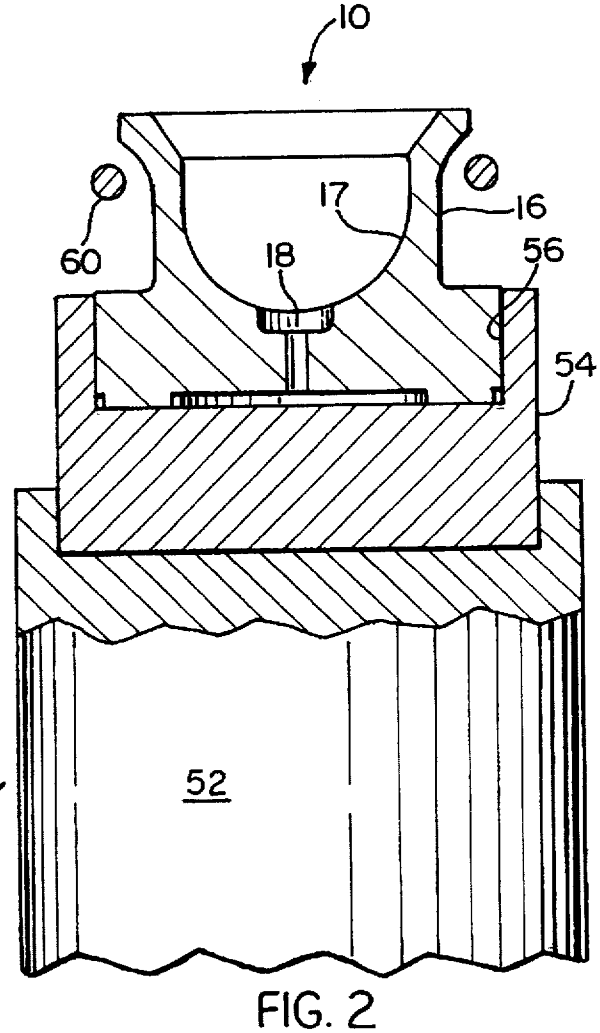
FIG. 2 is schematic illustration of a fixture utilized in the present invention.

The piston shoe 10 is machined from either Haynes 25 or Haynes Ultimet® materials. The wear surface 12 and back flange 14 are then provided with a Borofuse® coating via the thermal diffusion boride treatment. All other surfaces are masked with copper so that they will not be coated. Because the thermal diffusion boride treatment causes the occurrence of embrittling phases of the metal, it is necessary to restore sufficient ductility to flange 16 so that it can be crimped onto the head of the piston. To accomplish this, a solution treatment is utilized to effect a redissolving of the embrittling phases of the metal which occurred as a result of the Borofuse® process. Specifically, the solution treatment redissolves a Laves phase which precipitates during the Borofuse® coating of wear surface 12 and back flange 14. The solution treatment for Haynes Ultimet® is foreseen as being performed within a temperature range of 2050° to 2150° F. for a period of approximately ten minutes. The solution treatment for Haynes 25 is performed within a temperature range of 2150° to 2250° F. for a period of approximately ten minutes. For larger thickness parts the time will be greater, and will be less for thinner parts. Followed by gas cooling, this operation is performed in an inert or non-oxidizing atmosphere. The temperature of the Borofuse coated wear surface 12 in back flange 14 must be maintained at a cooler temperature in order to avoid melting of the Ni—B and Co—B eutectics. In order to accomplish this, the piston shoe 10 is placed within a fixture designated generally by reference numeral 50 in FIG. 2. Fixture 50 comprises a base or aluminum part 52 which positions a copper heat sink 54. Copper heat sink 54 has a recessed area 56 receiving the wear surface 12/backflange 14 area of shoe 10. A single coil 60 of an induction furnace is wrapped around the flange 16 to effect the desired temperature. The copper part or disk 54 will act as a heat sink, and will operate most effectively if the disk is substantially pure copper in order to provide a high thermal conductivity. After the heating or solution treatment is completed, flange 16 of the piston shoe 10 is then crimped onto the head 42 of the piston 40 illustrated in FIG. 3. A suitable die or tool is utilized to form the flange 16 into configuration about the round shape of piston head 42. During this cold working operation, the wear resistance and hardness of the material, either Haynes 25 or Haynes Ultimet® increases.

The present invention provides a process by which the wear resistance of a first area of a part is increased by means of a coating effected by a thermal diffusion boride coating process, and the wear resistance and cold workability of another or second area is increased or enhanced by means of a solution treatment without degrading the coating on the first area. The resulting part is suitable for use in a jet fuel environment.

We claim:

1. A process for increasing the wear resistance of an area of a part by means of a coating and treating another area of the part for cold working to enhance wear resistance, comprising the steps of providing the part which is made of a cold workable cobalt based alloy material, effecting selectively a thermal diffusion boride treatment of at least a first area of the part, and heating selectively a second area of the part to effect a solution treatment of the second area while maintaining the first area at a lower temperature sufficient to maintain thereon the boride coating, whereby the second area is suitable for cold working in order to affect the hardness thereof.

2. The process in accordance with claim 1, further comprising the step of masking the second area with copper prior to the thermal diffusion boride treatment.

3. The process in accordance with claim 1, wherein the selective heating of the second area is accomplished by induction heating.

4. The process in accordance with claim 1, wherein the step of maintaining the first area at a lower temperature is accomplished by means of contact with a copper part which absorbs heat therefrom.

5. The process in accordance with claim 4, wherein the copper part comprises substantially pure copper.

6. The process in accordance with claim 1, further comprising the step of cold working the second area in order to effect deformation thereof and a hardening of the material.

7. The process in accordance with claim 1, wherein the part comprises one of a member of a pump and a motor operating in fuel.

8. The process in accordance in accordance with claim 1, wherein the part comprises a piston shoe that is crimped onto the head of a piston.

9. The process in accordance with claim 1, wherein the selective heating is within a temperature range of 2050° to 2250° F.

10. The process in accordance with claim 1, wherein the material comprises one of UNS R30605 and UNS R31233.

11. A part having an area with increased wear resistance by means of a coating and another area treated for cold working in order to enhance wear resistance, the part comprising a cold workable cobalt based alloy material and which has a first area that is boride coated by a thermal diffusion boride treatment, and a second area suitable for cold working in order to affect the hardness thereof, the second area of the part having been heated selectively to effect a solution treatment of the second area while the first area was maintained at a lower temperature sufficient to maintain thereon the boride coating.

12. The part in accordance with claim 11, wherein the second area was masked with copper prior to the thermal diffusion boride treatment.

13. The part in accordance with claim 11, wherein induction heating was utilized to effect the selective heating of the second area.

14. The part in accordance with claim 11, wherein the first area was maintained at a lower temperature by means of contact with a copper part which absorbed heat therefrom.

15. The part in accordance with claim 14, wherein the copper part comprises substantially pure copper.

16. The part in accordance with claim 11, wherein the part comprises one of a member of a pump and a motor operating in fuel.

17. The part in accordance with claim 11, wherein the selective heating is within a temperature range of 2050°0 to 2250° F.

18. The part in accordance with claim 11, wherein the material comprises one of UNS R30605 and UNS R31233.

19. The part in accordance in accordance with claim 11, wherein the part comprises a piston shoe that is crimped onto the head of a piston.

* * * * *